Patented Aug. 18, 1925.

1,550,359

UNITED STATES PATENT OFFICE.

HERMAN HEUSER, OF EVANSTON, ILLINOIS.

MANUFACTURE OF STABLE BEVERAGES.

No Drawing.  Application filed March 9, 1923. Serial No. 624,029.

*To all whom it may concern:*

Be it known that I, HERMAN HEUSER, a citizen of the United States, residing at Evanston, in the county of Cook and State of Illinois, have invented new and useful Improvements in the Manufacture of Stable Beverages, of which the following is a specification.

This invention relates to improvements in the manufacture of stable beverage products, and will be fully understood from the following description thereof.

In the manufacture of beverages, such as fruit juice beverages, cereal beverages, milk containing beverages and the like, very frequently the beverage is found to show evidence of instability during the finishing process in its manufacture or after it has been packaged, particularly when glass containers are employed. Thus, in such beverages, it is frequently found that, during pasteurization, foreign tastes or odors are developed or the beverage becomes unduly cloudy or turbid. After packaging, turbidity or cloudiness may develop in such beverages as a result of the action of sun-light, of cold, or of vigorous agitation. Bacterial action sometimes arises, with similar results and frequently with great injury to the palatability and healthfulness of the beverage. Fermented beverages, and particularly cereal beverages such as low-alcoholic beer and similar products, are particularly susceptible to these changes, by reason of the nature of their nitrogenous constituents and their extreme susceptibility to change.

It has been found that in beverages, such as those hereinbefore referred to, a predisposing factor, and most probably the most important one, tending to produce the instability of the beverage is the presence of minute amounts of oxygen therein. Oxygen is normally present in such beverages to the extent of its normal solubility therein, and in the case of carbonated beverages additional oxygen is introduced in the carbon dioxide employed for carbonation. This contained oxygen leads to oxidation reactions under the influence of heat, as in pasteurization, of sunlight, agitation, etc., and its presence is an important factor in causing the undesirable growth of bacteria, both aerobic and anaerobic. I have found that a substantial removal of the oxygen of beverages may be effected by the use of phosphite compounds, such as phosphorous acid, hypophosphorous acid or pyrophosphorous acid, or their soluble salts, such as the alkaline metal salts. I prefer to employ a slight excess of the phosphite compounds over that necessary for the removal of the oxygen dissolved in the beverage and contained in the carbon dioxide used for carbonation, when the beverage is carbonated. The phosphite compounds remove the oxygen with the formation of phosphate compounds, which are not only non-toxic, but actually play a beneficent rôle in nutrition and metabolism.

In the use of phosphite compounds in fermented beverages, and particularly cereal beverages containing complex mixtures of nitrogenous compounds, I may employ in conjunction therewith a suitable proportion of a phlobatannin to effect the precipitation and removal of the more unstable nitrogenous compounds, commonly designated as albuminoids. The phlobatannins are effective for the removal of the more unstable nitrogenous compounds without affecting the highly nutritive albumoses and peptones normally contained in these beverages, thereby differing in its action from the ordinary tannins or tannic acids of commerce, which are gallotannins. In cereal beverages, the use of phlobatannins is of particular importance for the further reason that the nitrogenous compounds which are not affected by it are those to which the foam producing qualities and the "fullness" of the beverage are largely due.

My invention may suitably be illustrated in connection with the manufacture of a cereal beverage. A fermented beer stock may be made by any suitable brewing method, deprived of its alcohol contents by boiling in vacuo or under atmospheric pressure conditions, and may then be treated for the restoration of the normal beer aroma and flavor, for example, by the process described in my reissue Patent No. 14,889. In the manufacture of the beer itself, sufficient hops are preferably employed to insure the presence of a satisfactory proportion of hop resins in the dealcholized beverage. The dealcholized and treated beverage will contain, for example, about one cubic centimeter of oxygen to each 100 cubic centimeters of beverage. The carbon dioxide employed in carbonating it contains ordinarily about 0.5% of oxygen, and about 0.25 gram of carbon dioxide is required for each 100 cubic centimeters of beverage. I add to the beverage sufficient phosphite compound, for example, sodium hypophosphite to provide an excess over that required for reaction with the oxygen, a suitable amount being 0.009 gram per 100 cubic centimeters of beverage, this supplying an excess of slightly more than 20 per cent. This slight excess of the hypophosphite assures the complete removal of the oxygen and also of any additional oxygen that may be introduced in the packaging of the beverage.

As already referred to, in such beverages the addition of phlobatannin to aid the phosphite compound in maintaining stability of the beverage is beneficial. The phlobatannin may be added in the form of an aqueous extract, derived, for example, by the aqueous extraction of hops at temperature below the boiling point, as described in my Patent No. 1,302,550. Phlobatannin extracts may be prepared from hops or from other sources of phlobatannins in any other manner. The phlobatannin extract may be suitably added in sufficient quantity to provide from 0.004 to 0.008 gram of phlobatannin to 100 cubic centimeters of beverage. The amount of phlobatannin thus added is slightly in excess of that necessary for the precipitation of unstable nitrogenous compounds, the excess imparting to the beverage an agreeable astringency. The beverage is thoroughly agitated, preferably in a closed container, for the incorporation of the phosphite compound and the phlobatannin, and is then carbonated, preferably in bulk in the same container in which the phosphite compound and phlobatannin are incorporated. The beverage may subsequently be stored or packaged in the ordinary manner.

In the case of beverages of this type, the combined use of the phosphite compound and the phlobatannin result in rendering the beverage completely stable to cold, sunlight and agitation without the introduction of toxic compounds and without loss of nutritive quality or of palatability or fullness.

In some cases, for example in barrelled beverages, where this complete stability is not necessary, the use of the phlobatannin may be omitted.

In treating other beverages, such as soft drinks, fruit juices, milk beverages, and the like, the use of the phlobatannin is, of course unnecessary. In such cases, a suitable phosphite compound is employed in amounts sufficient to give a slight excess over the amount required to combine with the oxygen present in the beverage and that which may be introduced during carbonation and packaging. In each case the employment of the phosphite compound effects a complete removal of the oxygen and thereby avoids the disagreeable changes which take place in such beverages during pasteurization and during storage. The use of the phosphite compound results in the formation of phosphates, which are normal constituents of such foods as milk and of many fruit juices.

Although the present invention has been described in connection with the specific details of a process embodying the same, it is not intended that these details shall be regarded as limitations upon the scope of the invention except in so far as included in the accompanying claims.

I claim:

1. The method of stabilizing beverages which consists in incorporating therein a phosphite compound.

2. The method of stabilizing beverages which consists in incorporating therein a phosphite compound in amount at least sufficient to combine with the oxygen present in the beverage.

3. The method of producing stable carbonated beverages which consists in incorporating therein a phosphite compound in amount sufficient to combine with the oxygen contained in the beverage and that contained in the carbon dioxide employed in carbonation.

4. The method of preparing stable beverages which consists in incorporating therein sodium hypophosphite.

5. The method of preparing stable beverages which consists in incorporating therein sodium hypophosphite in amount about 20% in excess of that required for reaction with the oxygen present therein.

6. A cereal beverage containing a phosphite compound.

7. A cereal beverage containing sodium hypophosphite together with the phosphate reaction products formed by the oxygen of the beverage.

HERMAN HEUSER.